United States Patent
Hsu et al.

(10) Patent No.: US 11,256,687 B2
(45) Date of Patent: Feb. 22, 2022

(54) SURFACING RELATIONSHIPS BETWEEN DATASETS

(71) Applicant: Microsoft Technology Licensing, LLC, Redmond, WA (US)

(72) Inventors: Chien Chih Hsu, Beijing (CN); Qinying Liao, Beijing (CN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 695 days.

(21) Appl. No.: 14/716,281

(22) Filed: May 19, 2015

(65) Prior Publication Data
US 2016/0179925 A1    Jun. 23, 2016

Related U.S. Application Data

(63) Continuation of application No. PCT/CN2014/094625, filed on Dec. 23, 2014.

(51) Int. Cl.
*G06F 16/28* (2019.01)
*G06F 16/245* (2019.01)

(52) U.S. Cl.
CPC .......... *G06F 16/245* (2019.01); *G06F 16/283* (2019.01)

(58) Field of Classification Search
CPC . G06F 17/30424; G06F 16/245; G06F 16/283
USPC ........................................................ 707/722
See application file for complete search history.

(56) References Cited

U.S. PATENT DOCUMENTS

| | | | |
|---|---|---|---|
| 5,734,886 A | 3/1998 | Grosse et al. | |
| 6,006,225 A * | 12/1999 | Bowman | G06F 17/30395 |
| 6,144,958 A * | 11/2000 | Ortega | G06F 17/2725 |
| 6,374,209 B1 * | 4/2002 | Yoshimi | G06F 17/2745 |
| | | | 704/9 |
| 6,629,097 B1 * | 9/2003 | Keith | G06F 16/9558 |
| 6,701,309 B1 * | 3/2004 | Beeferman | G06F 17/30646 |
| 7,730,085 B2 | 6/2010 | Hassan et al. | |

(Continued)

FOREIGN PATENT DOCUMENTS

| | | |
|---|---|---|
| CN | 101079026 A | 11/2007 |
| CN | 101223525 A | 7/2008 |

(Continued)

OTHER PUBLICATIONS

"International Search Report & Written Opinion Received For PCT Application No. PCT/CN2014/094625", dated Jul. 17, 2015, 12 Pages.

(Continued)

*Primary Examiner* — Kannan Shanmugasundaram
(74) *Attorney, Agent, or Firm* — Buckley, Maschoff & Talwalkar LLC

(57) ABSTRACT

Technologies described herein relate to surfacing relationships between datasets. Datasets in a collection of datasets are assigned terms that are descriptive of content of the datasets. Co-occurrences of the terms in source documents that include unstructured text are identified, and relationships between datasets is identified based upon the co-occurrences of the terms in the source documents. The relationships between datasets are visualized in accordance with visualization instructions set forth by a user.

14 Claims, 15 Drawing Sheets

(56) References Cited

U.S. PATENT DOCUMENTS

| | | | |
|---|---|---|---|
| 7,747,632 B2* | 6/2010 | Korn | G06Q 30/02 707/751 |
| 7,849,049 B2 | 12/2010 | Langseth et al. | |
| 7,979,425 B2* | 7/2011 | Garg | G06F 17/30448 707/721 |
| 8,358,308 B2 | 1/2013 | Robertson et al. | |
| 8,463,786 B2 | 6/2013 | Udupa et al. | |
| 8,739,016 B1 | 5/2014 | Goldman et al. | |
| 8,745,054 B1* | 6/2014 | Hsu | G06F 17/30716 707/737 |
| 8,935,279 B2* | 1/2015 | Skeen | H04L 65/4084 707/754 |
| 2009/0228830 A1* | 9/2009 | Herz | G06F 3/04817 715/808 |
| 2010/0211609 A1 | 8/2010 | Xiong et al. | |
| 2010/0281036 A1* | 11/2010 | Inoue | G06F 16/90335 707/749 |
| 2011/0307485 A1* | 12/2011 | Udupa | G06F 16/367 707/737 |
| 2012/0278321 A1* | 11/2012 | Traub | G06F 17/30657 707/736 |
| 2014/0025650 A1 | 1/2014 | Lee et al. | |
| 2014/0046983 A1* | 2/2014 | Galloway | G06F 16/29 707/798 |

FOREIGN PATENT DOCUMENTS

| | | |
|---|---|---|
| CN | 102136006 A | 7/2011 |
| CN | 102314424 A | 1/2012 |
| CN | 103077157 A | 5/2013 |
| CN | 103955531 A | 7/2014 |
| CN | 104102723 A | 10/2014 |
| CN | 104160395 A | 11/2014 |
| EP | 0750266 A1 | 12/1996 |
| JP | 2004326479 A | 11/2004 |
| JP | 2010224625 A | 10/2010 |
| KR | 20110035001 A | 4/2011 |

OTHER PUBLICATIONS

Takhirov, et al., "An Evidence-based Verification Approach to Extract Entities and Relations for Knowledge Base Population", In Proceedings of the 11th international conference on the Semantic Web, vol. Part I, Nov. 11, 2012, 16 pages.

Allavena, Cesare, "Text Analytics for Context Intelligence: How to get more relevant insights from your unstructured data", Retrieved at «http://blog.squirro.com/post/61573628358/text-analytics-for-context-intelligence-how-to-get». Retrieval Date: Jul. 8, 2014, 7 pages.

Mousavi, et al., "Unsupervised Ontology Generation from Unstructured Text", In Cress Report 827, Apr. 2013, 24 pages.

"Search Report Issued In European Patent Application No. 14908704. 1", dated Jun. 8, 2018, 12 Pages.

"First Office Action and Search Report Issued in Chinese Application No. 201480076137.3", dated Apr. 2, 2019, 13 Pages.

"Office Action Issued in Chinese Patent Application No. 201480076137. 3", dated Jan. 6, 2020, 7 Pages.

"Second Office Action Issued in Chinese Patent Application No. 201480076137.3", dated Sep. 19, 2019, 11 Pages.

"Office Action Issued in European Patent Application No. 14908704. 1", dated Jun. 12, 2019, 8 Pages.

"Notice of Allowance Issued in Chinese Patent Application No. 201480076137.3", dated Jun. 30, 2020, 10 Pages.

* cited by examiner

SURFACING RELATIONSHIPS BETWEEN DATASETS

RELATED APPLICATION

This application is a continuation of International Application No. PCT/CN2014/094625, filed on Dec. 23, 2014 in the State Intellectual Property Office of the People's Republic of China, and entitled "SURFACING RELATIONSHIPS BETWEEN DATASETS". The entirety of this application is incorporated herein by reference.

BACKGROUND

To organize data and render the data suitable for processing, data is often stored in datasets. Typically, a designer of the dataset, at the time of defining a schema for the dataset, will also assign a classification to the dataset. Accordingly, the designer identifies related datasets by assigning the same classification to the datasets. For example, a police department may design and maintain an "accidents" dataset and a "tickets" dataset, where the "accidents" dataset includes data about automobile accidents in the city, while the "tickets" dataset includes data about traffic tickets given to travelers in the city. A designer of the datasets can assign the classification "traffic" to both datasets; therefore, a reviewer can search for datasets assigned the classification "traffic", and ascertain that the two datasets referenced above are related. The relation between these datasets, however, is static. Further, there is currently a lack of suitable mechanisms for surfacing relationships between datasets to users.

SUMMARY

The following is a brief summary of subject matter that is described in greater detail herein. This summary is not intended to be limiting as to the scope of the claims.

A computing system is described herein. The computing system is configured to identify relationships between data sets. The computing system includes a processor and computer-readable storage, the computer-readable storage comprises components that are executed by the processor. The components comprise a filter component that receives a query that identifies at least one of a first term or a second term, the first term designated as being descriptive of content of a first dataset, the second term designated as being descriptive of content of a second dataset. The filter component further accesses a data cube and extracts a count value therefrom responsive to receipt of the query, the count value being indicative of an aggregate number of occurrences of the first term in a subset of documents from amongst a plurality of source documents, the second term is identified in the data cube as being a primary term for each document in the subset of documents. The components also include a visualizer component that forms a visualization based upon the count value extracted from the data cube by the filter component, the visualization indicates that the first dataset is related to the second dataset.

DETAILED DESCRIPTION

Figure 1:
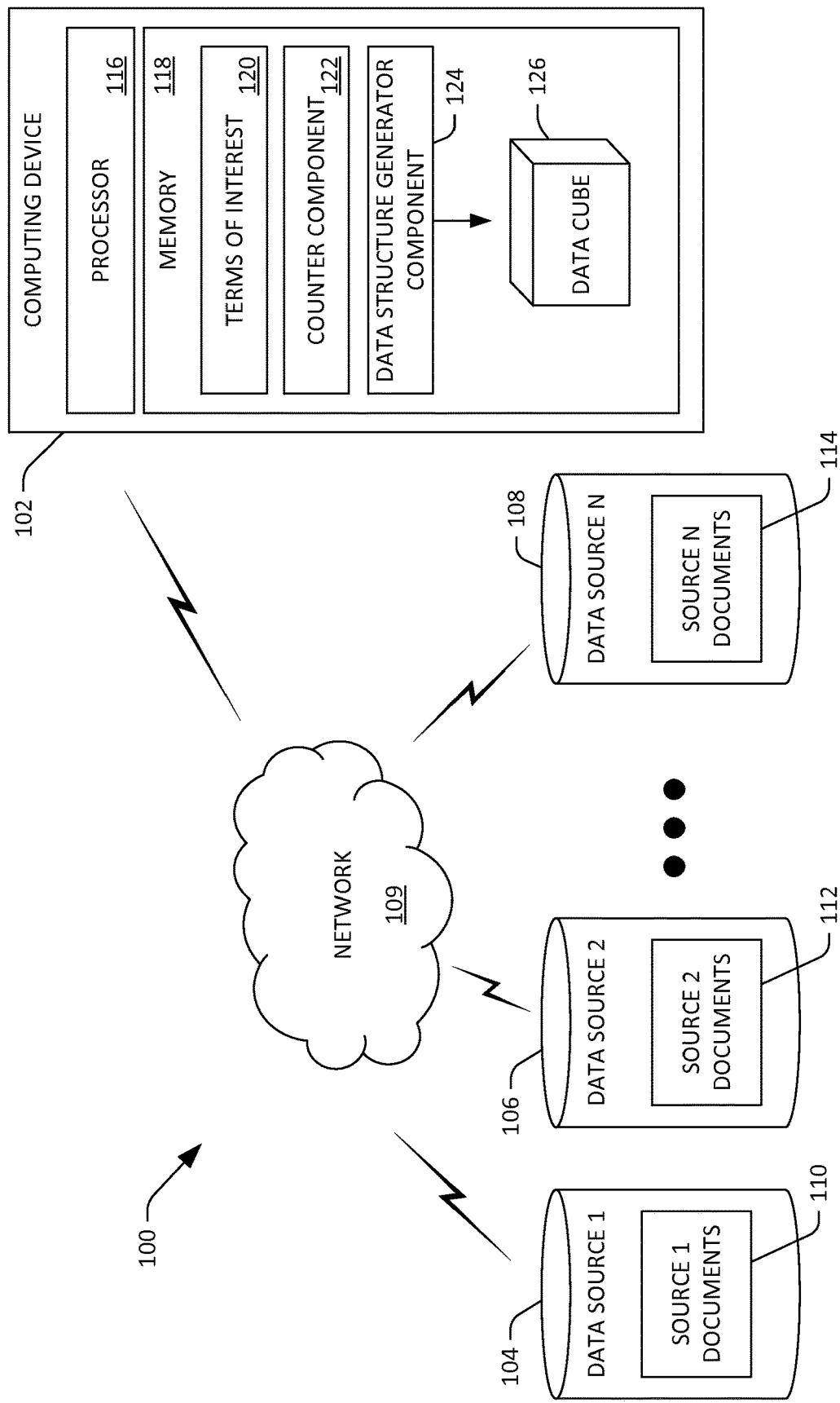
FIG. 1 is a functional block diagram of an exemplary system that is configured to construct a data cube, the data cube being suitable for use when constructing a visualization that represents relationships between datasets.

Various technologies pertaining to visualizing relationships between datasets are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

Various technologies pertaining to surfacing relationships between datasets are described herein. The technologies described herein enable users to identify that two or more different datasets are related to one another, even when such datasets were not indicated as being related at time of construction. Further, the technologies described herein enable users to define relationships between datasets to be visualized. Thus, the technologies described herein provide the user with information about relationships between datasets that has heretofore been unavailable.

With reference now to FIG. 1, an exemplary system 100 that is configured to construct and/or update a data structure having more than two dimensions (e.g., a data cube) is illustrated, where the data cube, when constructed, comprises data that is indicative of relationships between entities, such as datasets. The system 100 comprises a computing device 102, which may be any suitable computing device, including but not limited to a server computing device, a client computing device (e.g., a desktop computing device, a laptop computing device, a tablet computing device, mobile telephone, a wearable computing device, or the like). The computing device 102 can access a plurality of data sources 104-108 by way of a network 109. In a non-limiting example, the network 109 may be the Internet. The plurality of data sources 104-108 include a respective plurality of source documents 110-114. Thus, the first data source 104 includes first source documents 110, the second data source 106 includes second source documents 112, and the nth data source 108 includes nth source documents 114.

In an example, at least one of the data sources 104-108 may be a social networking application or site. For instance, the first data source 104 may be a social networking application or site, and the source documents 110 may be publicly-accessible posts, comments, messages, etc. set forth by users of the social networking application or site. In another example, at least one of the data sources 104-108 may be a news application or site. Therefore, for instance, the second data source 106 may be a news application or site, and the second source documents 112 can be or include news items or stories published by way of the news application or site, user comments set forth with regard to the news stories, etc. In still yet another example, at least one of the data sources 104-108 may be a weblog application or site. Thus, the nth data source 108 may be a weblog application or site, and the nth source documents 114 can be publicly-accessible weblog posts, comments to such posts, etc. From the foregoing, it can be ascertained that the source documents 110-114 can include any suitable document, post, news story, or the like that includes unstructured text.

The computing device 102 is programmed to extract data from the source documents 110-114, wherein the extracted data is indicative of relationships between terms included in the text of the source documents 110-114. As used herein, a "term" is intended to encompass a word, a phrase, an acronym, an abbreviation, and the like. The data extracted from the source document can in turn be used to infer relations between datasets.

With more particularity, a dataset may have a term assigned thereto, wherein the term is indicative of content of the dataset. For instance, the term may be a title of the dataset. In another example, the term may be a tag assigned to the dataset by the designer of the dataset. In yet another example, the dataset may have rows and columns, with titles assigned to the rows and columns: one or more of these titles can be a tag for the dataset. In still yet another example, terms within a threshold number of most frequently occurring terms in the dataset may be tags that are assigned to the dataset. Each dataset in a dataset collection of interest may have at least one term assigned thereto. Therefore, when a first term assigned to a first dataset (which is indicative of content of the first dataset) and a second term assigned to a second dataset (which is indicative of content of the second dataset) are found to be related based upon analysis of the source documents 110-114, then it can be inferred that the content of the first dataset and the second dataset are likewise related.

The computing device 102 comprises a processor 116 and a memory 118, wherein contents of the memory 118 are accessible to the processor 116. For example, the memory 118 can include data that is accessible to the processor and components that are executed by the processor. The memory 118 may optionally include terms of interest 120. For example, each term in the terms of interest 120 may be assigned to at least one dataset of interest. Thus, for example, the terms in the terms of interest 120 may be titles of datasets in a dataset collection.

The memory 118 also includes a counter component 122 that is configured to search at least a subset of the source documents 110-114 for terms in the terms of interest 120. Generally, the counter component 122 is configured to identify co-occurrence of pairs of terms in the source documents 110-114, where each term in a pair of terms is included in the terms of interest 120. In a non-limiting example, the counter component 122 can be configured to count, for each document in the source documents that includes term q in the terms of interest 120, a number of occurrences of term i.

Therefore, for example, the computing device 102 can access the first data source 104 and acquire a first source document from the first source documents 110. The counter component 122 can be configured to count, for each term in the terms of interest 120 that exist in the first source document, a number of occurrences of the term. Optionally, the counter component 122 can label a term as being a primary term for the first source document based upon the numbers of occurrences of terms in the first source document. For instance, a term can be labeled as a primary term for a document when the term is one of a threshold number of most frequently occurring terms in the document. In another example, a term can be labeled as a primary term for a document when the term is included in a title or abstract of the document. In yet another example, a term can be labeled as a primary term of a document when the term is in the title of the document and is also amongst a top threshold number of most frequently occurring terms in the document.

In an example, responsive to the counter component identifying the primary term of the first source document, the counter component 122 can determine that the terms of interest 120 do not include the primary term. In this case, the counter component 122 can refrain from computing co-occurrences of terms (in the terms of interest 120), and can access a next source document from the source documents 110-114.

When, however, the counter component 122 ascertains that the primary term of the first source document is included in the terms of interest 120, then the counter component 122 can count, for each term of interest that is in the first source document, a number of occurrences of the term of interest. In a non-limiting example, if the terms of interest 120 include the terms "accident" and "ticket", and the counter component 122 determines that the primary term of the first source document is "accident", the counter component 122 can count a number of occurrences of the term "ticket" in the source document. The counter component 122 can compute a respective count value for each term of interest identified in the terms of interest 120. Thus, the counter component 122 can output data that includes: 1) an identity of the primary keyword of the first source document; and 2) count values that are indicative of numbers of occurrences of other terms of interest in the first source document. Additionally, the data output by the counter component 122 can include an identity of a source of the first source document (e.g., the first data source 104), and can further include a timestamp that is indicative of a time of posting or creation of the source document. After the counter component 122 has completed this processing for the first source document, the counter component 122 can access a next source document and repeat the processing described above. Thus, the counter component 122 can perform the processing for each source document in each of the data sources 104-108.

In another exemplary embodiment, the counter component 122 can perform the above-referenced processing without regard to any terms of interest. In such an embodiment, the counter component 122 can access a source document and identify the primary keyword thereof. The counter component 122 may then count numbers of occurrences of every other term in the source document (exclusive of terms in a predefined stop list), such that the output of the counter component 122, for each source document, is data that includes: 1) an identity of the primary term (or primary terms) of the source document; 2) identities of other terms in the source document; 3) count values for each term in the source document; 4) a source of the source document; and 5) a timestamp.

The memory 118 also comprises a data structure generator component 124 that is in communication with the counter component 122. The data structure generator component 124 receives output of the counter component 122 and generates a data cube 126 that is based upon the output of the counter component 122. In an example, as shown, the data cube can have several dimensions, including but not limited to primary term, time, and/or data source. As can be ascertained, the data cube 126 indexes the count values described above by the dimensions referenced above. As will be described in greater detail below, these count values in the data cube 126 can be utilized to surface relations between datasets.

Figure 2:
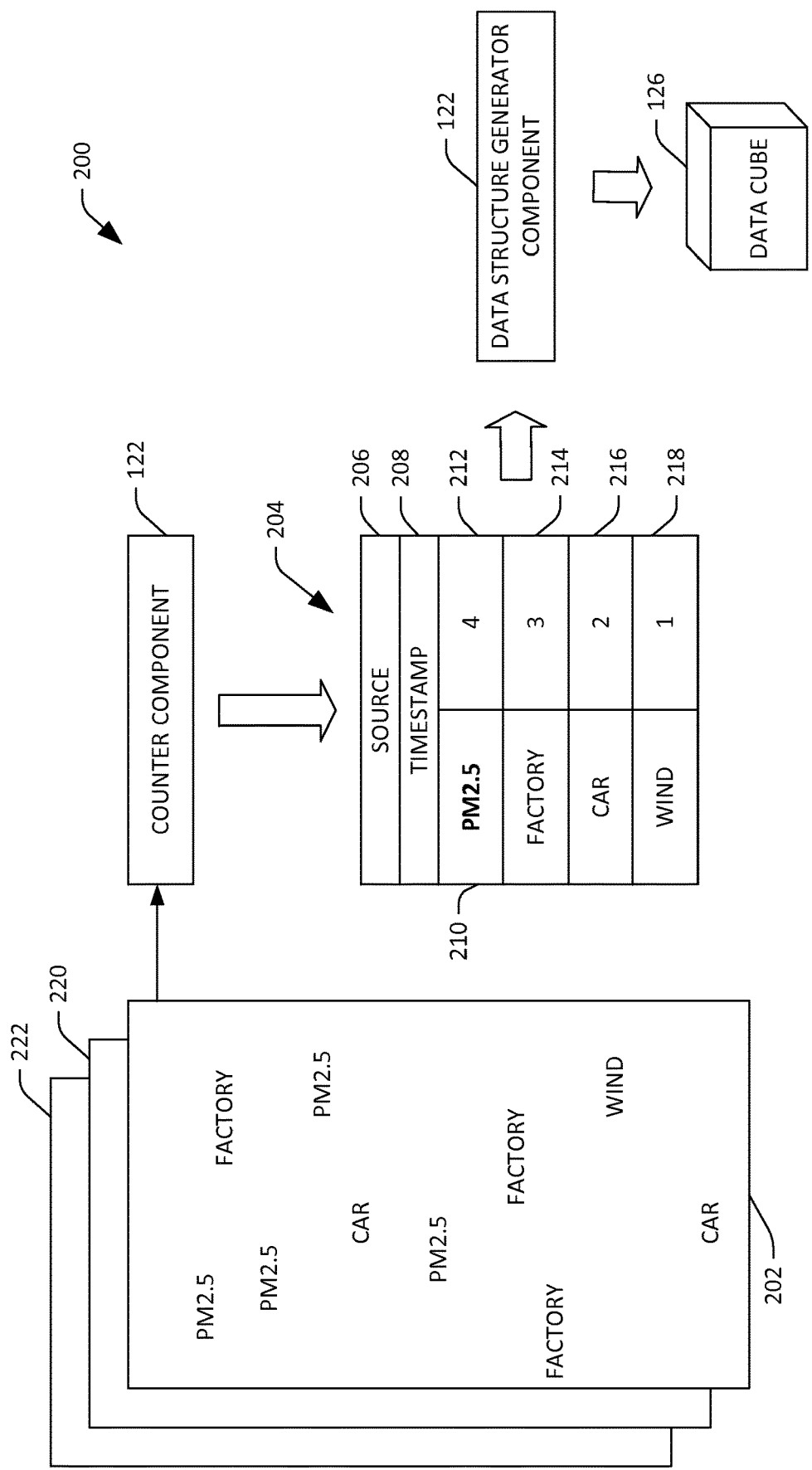
FIG. 2 is a diagram that illustrates exemplary construction of the data cube.

Turning now to FIG. 2, a diagram 200 that illustrates an exemplary operation of the counter component 122 with respect to a source document 202 is illustrated. As indicated above, the counter component 122 can access one or more of the data sources 104-108 by way of the network 109, and can acquire the source document 202 from such data sources. In this example, the source document 202 includes the following terms: PM2.5, FACTORY, CAR, and WIND. In this example, these terms are included in the terms of interest 120.

The counter component 122 accesses the source document 202 and counts the number of occurrences of each of the above-mentioned terms in the source document 202. As shown, the counter component 122 can determine that the term PM2.5 occurs four times in the source document 202, the term FACTORY occurs three times in the source document 202, the term CAR occurs twice in the source document 202, and the term WIND occurs once in the source document 202. In this example, the primary term is the term that occurs most often in the source document 202. Therefore, the counter component 122 can identify PM2.5 as being the primary term. The counter component 122 can also identify the data source from which the source document 202 was acquired, as well as a time value assigned to the source document 202.

Based upon the foregoing, the counter component 122 can output a data structure 204. The data structure 204 can include a field 206 that identifies the source from which the source document 202 was acquired, a field 208 that identifies a timestamp assigned to the source document 202, a field 210 that identifies the primary keyword of the source document 202 (e.g., PM2.5), and fields 212-218 that identify count values (numbers of occurrences in the source document 202) of the terms PM2.5, FACTORY, CAR, and WIND. Responsive to the counter component 122 outputting the data structure 204, the counter component 122 and can access a next source document 220, and repeat the processing described above. After the counter component 122 completes processing on the source document 220, the counter component 122 can access the next source document 220 until all source documents across the sources 104-108 have been processed.

As described above, the data structure generator component 124 can receive the data structure 204, as well as other data structures corresponding to the remainder of the source documents analyzed by the counter component 122, and can construct the data cube 126 based upon such data structures.

Figure 3:
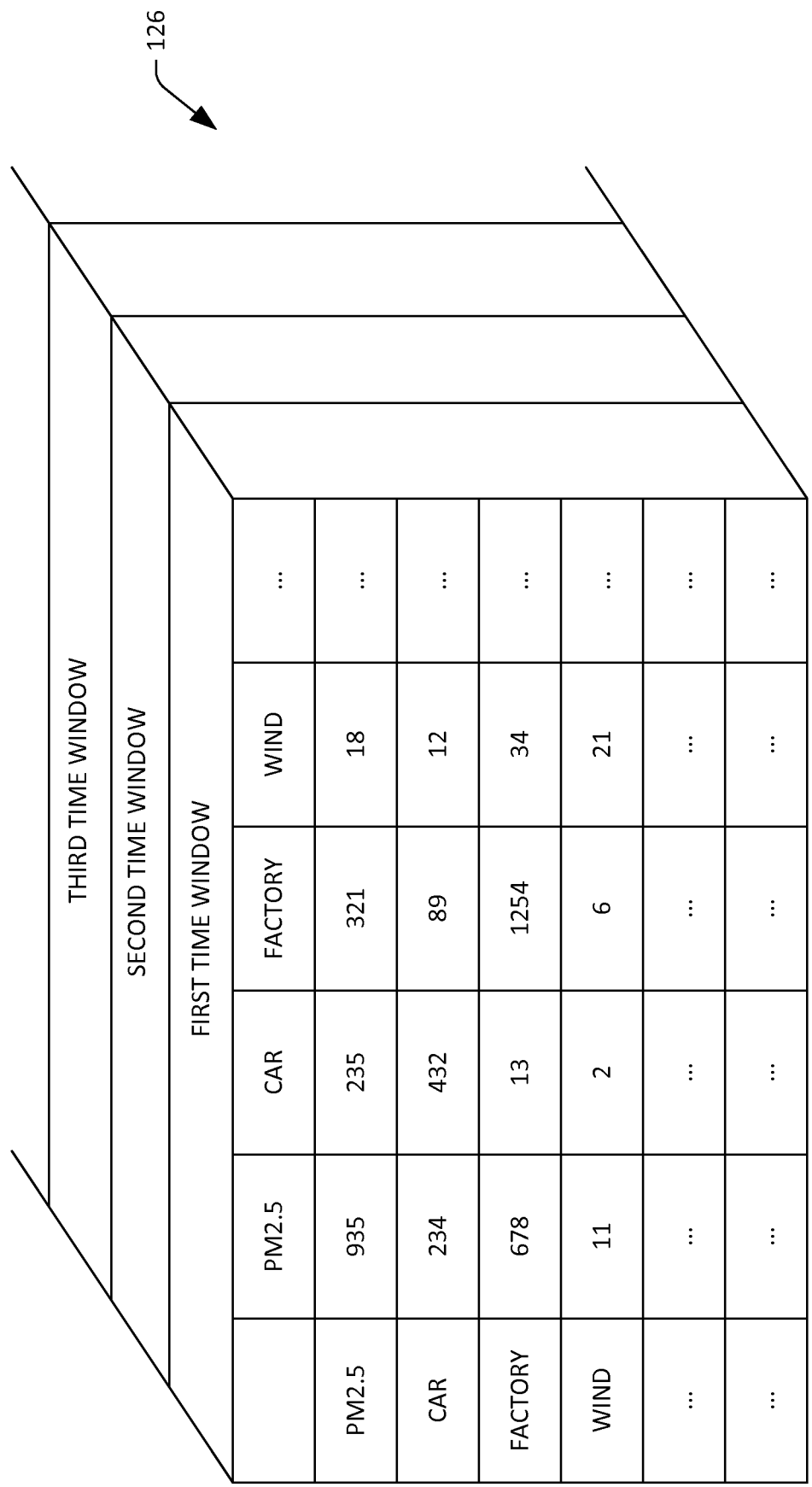
FIG. 3 illustrates an exemplary data cube that can be constructed by way of the system shown in FIG. 1.

With reference now to FIG. 3, an exemplary depiction of a three-dimensional data structure (e.g., the data cube 126) is illustrated. As shown in FIG. 3, aggregate count values computed by the counter component 122 for terms in the source documents 110-114 can be indexed by at least one of primary term, time, and data source. For purposes of explanation, the data cube 126 shown in FIG. 3 is shown as indexing count values by primary term and time. The data cube 126 includes a column 302 of primary terms identified in the source documents 110-114. The data cube 126 also includes count values that are indicative of numbers of occurrences of terms (e.g., in the terms of interest 120) indexed by the primary terms. For example, when the term PM2.5 was a primary term in the source documents 110-114, the term PM2.5 occurred 935 times, the term CAR occurred 235 times, the term FACTORY occurred 321 times, and the term WIND occurred 18 times.

These count values can indicate that, in the source documents 110-114, the relationship between the term PM2.5 and the term FACTORY is stronger than the relationship between the term of PM2.5 and the term WIND. In another example, when the term FACTORY was the primary term in source documents, the term PM2.5 occurred 678 times, the term CAR occurred 13 times, and the term WIND occurred 34 times. The count values depicted in the data cube 126 in FIG. 3 can be aggregate count values across time. As can be ascertained, the count values can also be indexed by time. This would allow a user to ascertain, for example, a count value for the term CAR when the term PM2.5 is the primary term for a defined time window (e.g., the last month). Additionally, as noted above, the count values can be indexed by source. Therefore, a count value for the term CAR, when the term PM2.5 is the primary term, can be obtained for particular sources. Thus, the data cube 126 can be queried based upon term, primary term, threshold count value, source, time, or any suitable combination thereof.

Figure 4:
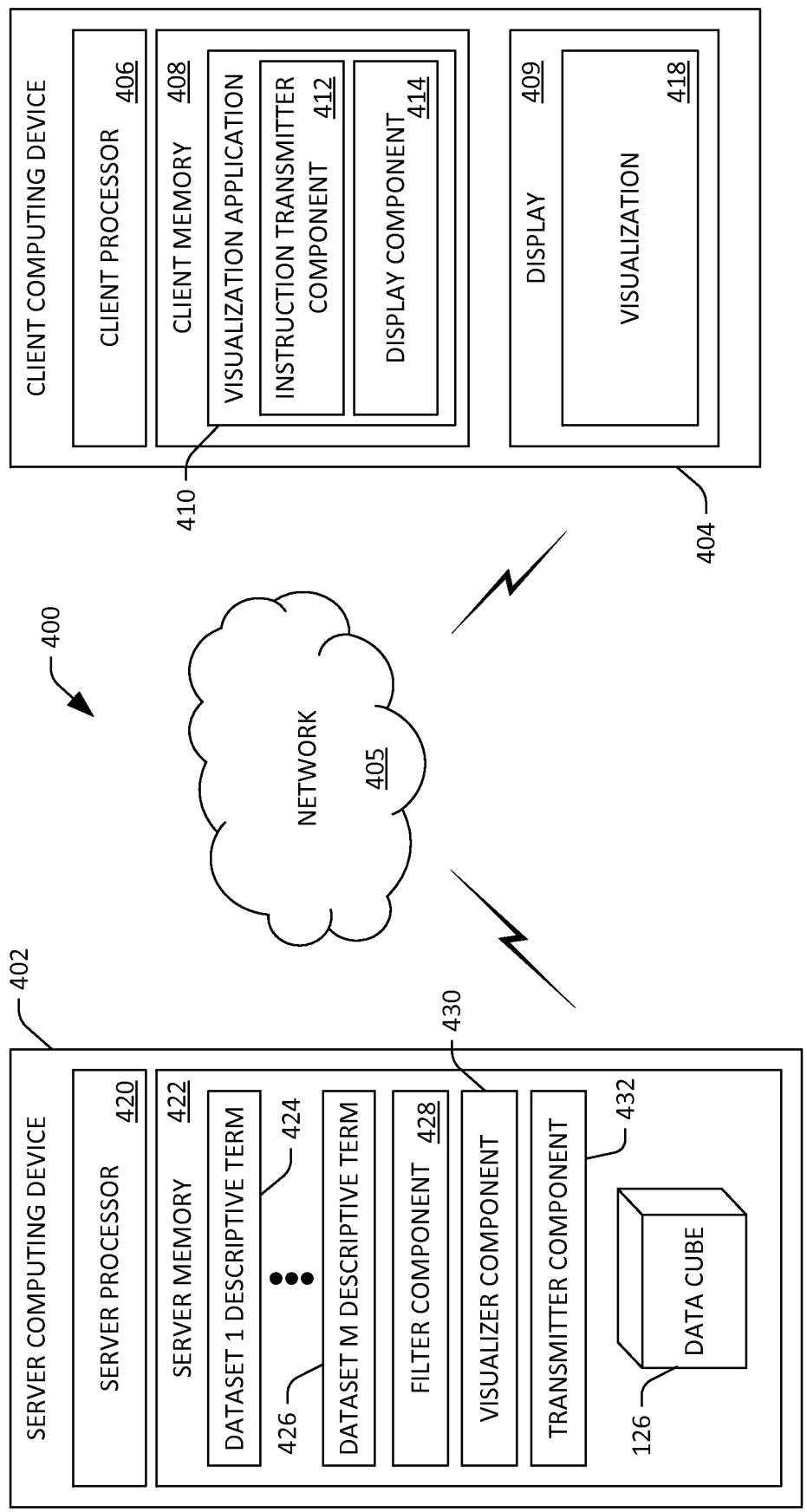
FIG. 4 is a functional block diagram of an exemplary system that is configured to surface relationships between datasets to a user.

Turning now to FIG. 4, an exemplary system 400 that facilitates visually surfacing relationships between datasets is illustrated. The system 400 includes a server computing device 402 and a client computing device 404, where the server computing device 402 and the client computing device 404 are in communication by way of a network 405 (e.g., the Internet). The client computing device 404 includes a client processor 406 and a client memory 408, where the client memory 408 comprises computer-executable instructions that are accessible to the client memory 408. The client computing device 404 also comprises (or is in communication with) a display 409 that is configured to present graphical data to a user.

The client memory 408 includes a visualization application 410 that is generally configured to visualize datasets and relations there between. In an example, a browser can comprise the visualization application 410. The visualization application 410 includes an instruction transmitter component 412 that is configured to receive visualization instructions from a user of the client computing device 404. The visualization instructions can include an identity of a dataset, where the user wishes to ascertain and analyze relationships about the dataset (e.g., the user wishes to identify other datasets that are related to the identified dataset). The visualization instructions can also include filter parameters, wherein dataset relationships are identified and visualized based upon the filter parameters. As will be described in greater detail below, the instruction transmitter component 412 can receive filter parameters by way of user interface controls (tools), such as sliders, radio buttons, pull-downs, etc.

Exemplary filter parameters include a time range or time ranges, source identity, relationship strength threshold, etc. For example, when a user wishes to be provided with a visualization about relationships pertaining to a particular dataset based upon social networking posts made in the last week, the user can set forth input such that the visualization instructions identify the particular dataset, the social networking site, and the time range (of the last week). Further, the user can express a desire to be provided with the five most related datasets to the identified dataset (based upon the above-referenced social networking post), and the visualization instructions can include a threshold value that limits a number of datasets represented in a returned visualization. In yet another example, the user can request that the resulting visualization only include representations of datasets that have some threshold amount of relation to the identified dataset, and such desire can be expressed in the visualization instructions.

The visualization application 410 also includes a display component 414 that is configured to receive a visualization from the server computing device 402. When the display component 414 receives a visualization from the server computing device 402, the display component 414 is configured to control the display 409, such that a visualization 418 is presented thereon. The visualization 418 graphically depicts relations between datasets in accordance with the visualization instructions transmitted by the instruction transmitter component 412. Further, the visualization 418 can be updated in real-time as a user sets forth filter parameters (e.g., by way of the user interface controls referenced above).

The server computing device 402 includes a server processor 420 and a server memory 422, wherein the server memory 422 is accessible to the server processor 420. For example, the server memory 422 can include data that is accessible to the server processor 420, and can further include components that can be executed by the server processor 420. The server memory 422 include terms that are assigned to datasets as being descriptive of contents of the datasets. For example, the terms can be titles of the datasets, tags assigned to the datasets by a designer or maintainer of the datasets, etc. With more particularity, the server memory 422 includes a first term 424 through an mth term 426, where the terms 424-426 are assigned to respective first through mth datasets. Additionally, while not shown, the server memory 422 can also include data that is indicative of sizes of the first dataset through the mth dataset (e.g., dated that is indicative of the numbers of entries in the datasets), as well as data that is indicative of categories (classifications) to which the datasets are assigned.

The server memory 422 also includes a filter component 428 that is configured to receive the visualization instructions transmitted to the server computing device 402 by the instruction transmitter component 412; the filter component 428 is configured to query the data cube 126 based upon the virtualization instructions. For example, responsive to receipt of visualization instructions, the filter component 428 can be configured to construct and execute such queries over the data cube 126, wherein the queries are configured to filter the data cube 126 in accordance with the visualization instructions.

In a non-limiting example, the filter component 428 can receive, from the client computing device 404, an identity of a first dataset and an indication that a visualization is to depict all datasets (in a collection of datasets) that are related to the first dataset. The filter component 428 can identify the first term 424 assigned to the first dataset and can query the data cube 126 based upon such term. Referring to FIG. 3, the term may be PM2.5. The filter component 428 can query the data cube 126 for count values that are indexed by PM2.5 (e.g., when PM2.5 is the primary term). Based upon this querying, the filter component 428 can acquire count values of 235, 321, and 18 for the terms CAR, FACTORY, and WIND, respectively. In another example, the filter component 428 can aggregate count values, such that count values indexed by column can be added to count values indexed by row (e.g., for CAR, 235+234, for FACTORY, 325+678, and for WIND, 11+18).

The server memory 422 also includes a visualizer component 430 that is in communication with the filter component 428 and is configured to construct a visualization based upon output of the filter component 428. Continuing with the example above, the visualizer component 430, responsive to receiving the output of the filter component 428, can identify datasets that have terms CAR, FACTORY, and/or WIND assigned thereto. The visualizer component 430 can then construct a visualization that comprises a plurality of nodes, wherein a first node represents the dataset identified in the visualization instructions, a second node represents a dataset with the term CAR assigned thereto, a third node represents a dataset with the term FACTORY assigned thereto, and a fourth node represents a dataset with the term WIND assigned thereto. Further, the visualizer component 430 can construct the nodes such that sizes thereof (in the visualization) are respectively representative of numbers of entries in the datasets represented by the nodes. In another example, the visualizer component 430 can construct the nodes such that the nodes are colored to represent categories of the datasets. Further, the visualizer component 430 can construct the visualization such that the first node is coupled to the second node by a first edge, the first node is coupled to the third node by a second edge, and the first node is coupled to the fourth node by a third edge. The visualizer component 430 can cause the length and/or line weight of the edges to be indicative of the count values extracted from the data cube 126—therefore, the length and/or line weight of the edges can be indicative of strengths of relationships between datasets that are represented by nodes coupled by the edges.

The server memory 422 also includes a transmitter component 432 that is configured to transmit the visualization constructed by the visualizer component 430 to the client computing device 404 by way of the network 405. The client computing device 404, responsive to receiving the visualization, can then render the visualization 418 on the display 409.

Operation of the system 400 is now described. A user of the client computing device 404 sets forth visualization instructions to the visualization application 410. Again, as noted above, these visualization instructions can include an identity of at least one dataset, as well has filter parameters that are to be used to acquire count values from the data cube 126. The instruction transmitter component 412, responsive to receipt of the visualization instructions from the user, transmits the visualization instructions to the server computing device 402 by way of the network 405. The filter component 428 receives the visualization instructions, constructs a query based upon the visualization instructions, and executes the query over the data cube 126. The filter component 428 thus acquires count values for terms related to a term that is assigned to the dataset identified by the user. The visualizer component 430 receives the count values extracted from the data structure 126 by the filter component 428, and constructs a visualization based upon the count values. The transmitter component 432 transmits the visualization to the client computing device 404 by way of the network 405.

The visualization application 410 receives the visualization, and the display component 414 controls the display 416 to cause the visualization 418 to be rendered on the display 416. The user can review the visualization 418 to identify relationships between datasets. The user may then refine the visualization 418 by submitting subsequent instructions to the instruction transmitter component 412. The server computing device 402 may then update the visualization based upon such instructions and transmit the updated visualization back to the client computing device 404. Accordingly, the user can be provided with a visualization and interact with such visualization (e.g., by providing filter parameters through use of user interface controls), and the system 400 can update the visualization 418 in real-time, thus allowing the user to explore relationships between datasets based upon various filter parameters or combinations of filter parameters.

While the system 400 is depicted in a client-server arrangement, it is to be understood that the functionality described as being performed by the server computing device 402 and the client computing device 404 may be performed by a single computing device. For example, the client memory 408 may include the dataset terms 424-426, the filter component 428, the visualizer component 430, and the data cube 126.

It is also to be understood that the filter component 428 can perform any suitable filtering over the data cube 126. For example, the filter component 428 can filter or aggregate count values by time. Accordingly, the user can ascertain a strength of relationships between datasets based upon co-occurrences of terms assigned to the datasets over the last week. In another example, the filter component 428 can filter count values by source. For instance, the user may indicate a data source that the user believes to be highly credible and relevant to a dataset (e.g., a particular news site), and the filter component 428 can acquire count values pertaining to the dataset that are based upon term co-occurrence in source documents from such data source.

In yet another example, the filter component 428 can extract count values from the data cube 126 based upon a specified threshold. For instance, the user can set forth a command that indicates that, for two datasets to be deemed related, a count value for terms that are representative of contents of the two datasets must be above a threshold. In still yet another example, the filter component 428 can extract count values from the data structure 126 based upon a threshold number of relationships that are to be included in the visualization. For example, the user can indicate that the visualization is to represent a top n most related datasets to a dataset, where n is set by the user.

Figure 5:
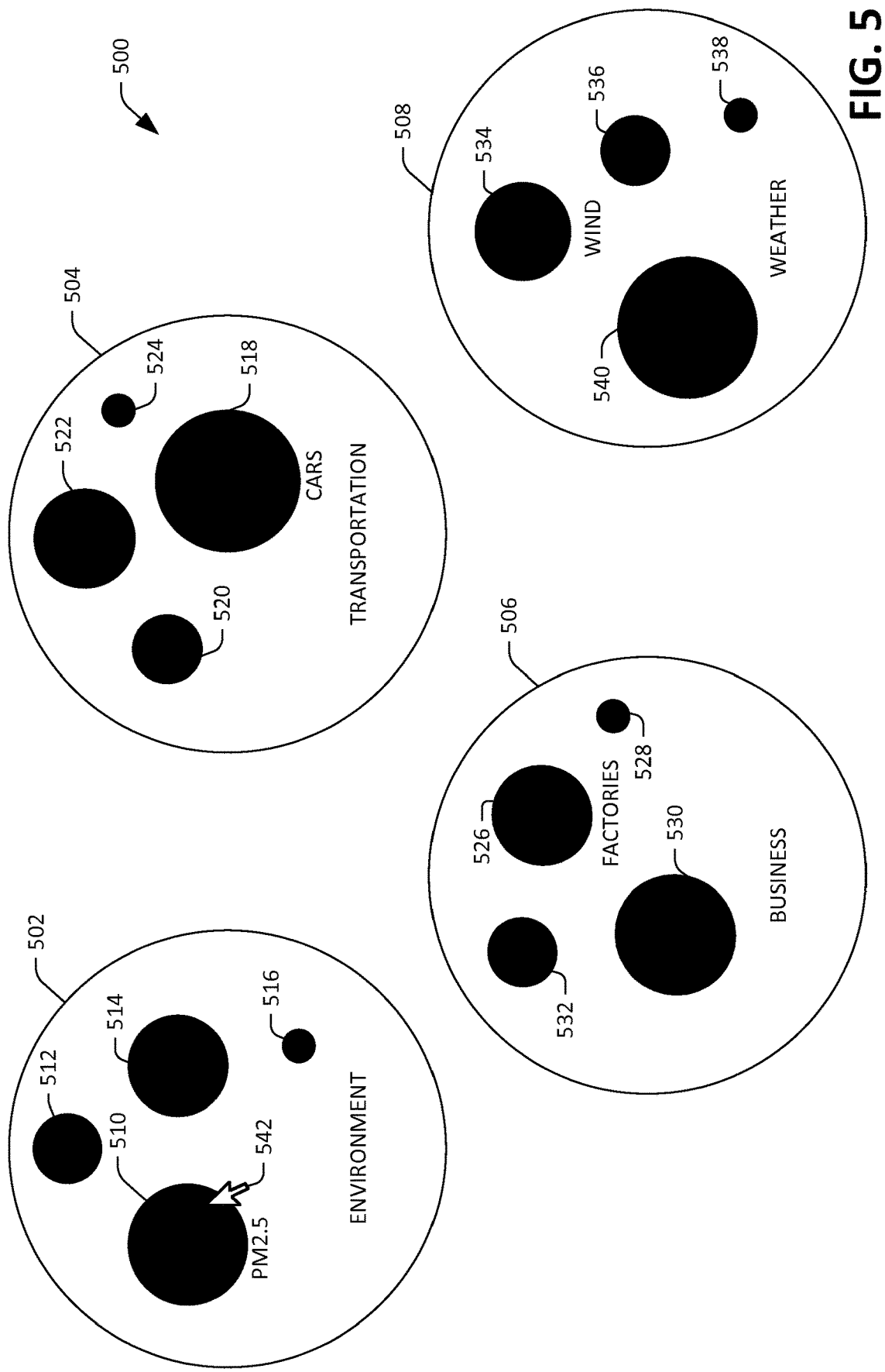
FIG. 5 illustrates an exemplary visualization.

With reference now to FIG. 5, an exemplary visualization 500 that can be constructed by the visualizer component 430 and rendered by the display component 414 is illustrated. The visualization 500 includes a plurality of nodes 502-508 that are respectively representative of four classifications that can be assigned to datasets. For example, the node 502 can represent an ENVIRONMENT classification, the node 504 can represent a TRANSPORTATION classification, the node 506 can represent a BUSINESS classification, and the node 508 can represent a WEATHER classification.

Each classification can be applied to multiple datasets. Therefore, each of the nodes 502-508 can comprise a respective plurality of nodes that are representative of datasets that are classified by the classifications. More particularly, the first node 502 can include nodes 510-516 that are respectively representative of four datasets that are classified as belonging to the ENVIRONMENT classification. Similarly, the node 504 can include nodes 518-524 that are respectively representative of datasets that are classified as belonging to the TRANSPORATION classification; the node 506 can include nodes 526-532 that are respectively representative of datasets that are classified as belonging to the BUSINESS classification; and the node 508 can include nodes 534-540 that are respectively representative of datasets that are classified as belonging to the WEATHER classification.

In an example, the visualizer component 430 can construct the visualization 500 such that the nodes 510-540 have a size that is representative of a number of entries in the respective datasets represented by the nodes 510-540. Continuing with the example set forth herein, the node 510 represents a dataset that is assigned the term PM2.5 (e.g., titled PM2.5), the node 518 represents a dataset that is assigned the term CARS, the node 526 represents a dataset that is assigned the term FACTORIES, and the node 534 represents a dataset that is assigned the term WIND.

The visualization 500 shown in FIG. 5 depicts relationships defined by the creator(s) of the classifications and datasets represented by the nodes 502-540. Accordingly, the user can ascertain that the nodes 534-540 represent datasets that are about weather. To discover additional relationships between datasets, a user viewing the visualization 500 on the display 416 can select a node that is representative of a dataset of interest in the visualization 500. As shown in FIG. 5, the user can employ a pointing mechanism 542 to select the node 510 that is representative of the dataset assigned the term PM2.5. As indicated previously, PM2.5 maybe the title of the dataset. Other techniques for selecting nodes (and thus datasets) are contemplated, including selecting the node 510 by way of a gesture, a voice command, etc. Selection of the node 510 acts as an instruction provided to the instruction transmitter component 412. For instance, selection of the node 510 can be performed by the user to indicate that the user wishes to be provided with information about which datasets are related to the PM2.5 dataset. As described previously, the user may also set forth other filter parameters (e.g., by way of user interface controls described herein).

Figure 6:
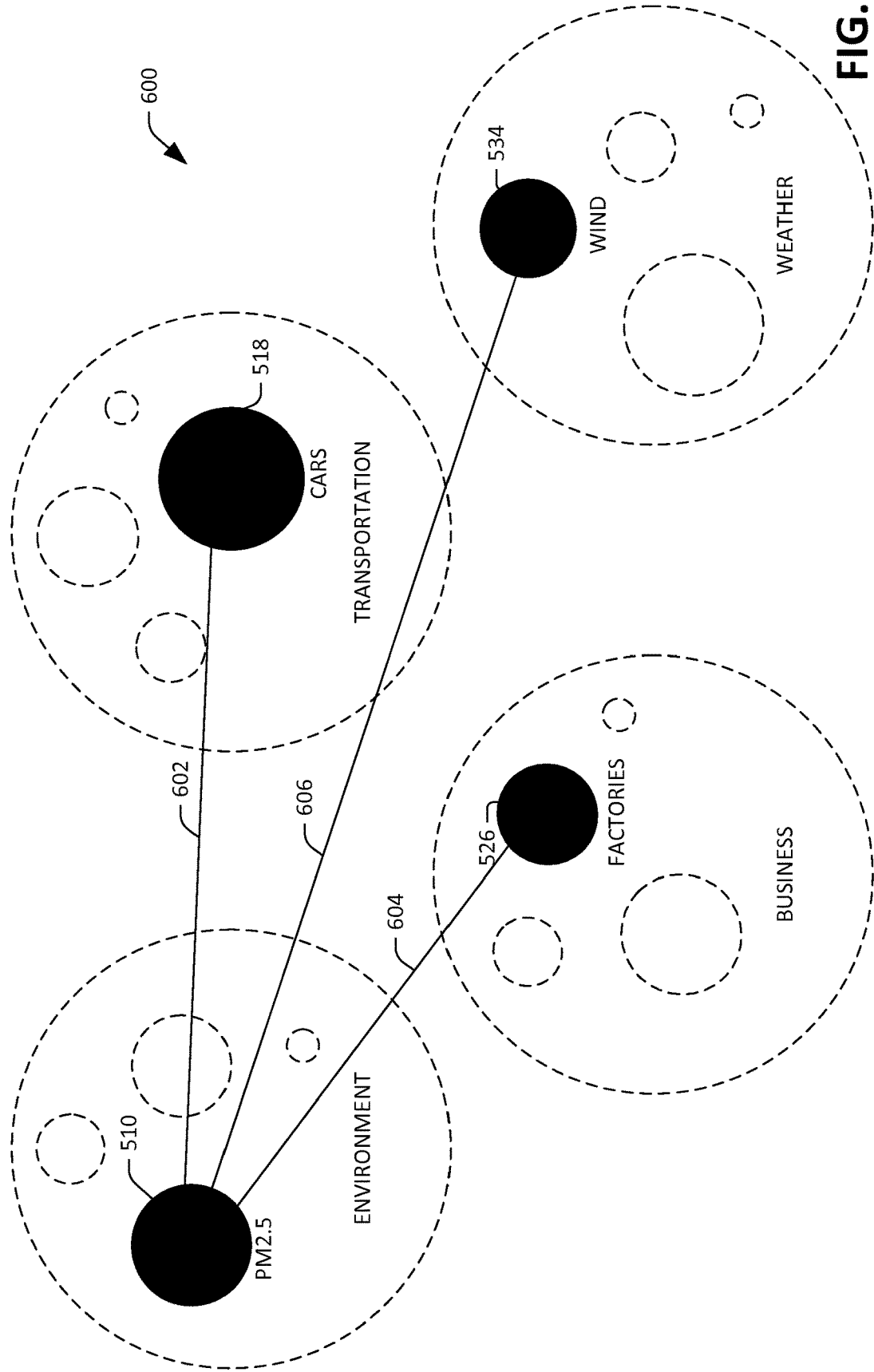
FIG. 6 illustrates an exemplary visualization that depicts relationships between datasets.

With reference now to FIG. 6, an exemplary visualization 600 that can be constructed by the visualizer component 430 responsive to the filter component 428 extracting count values from the data cube 126 based upon the selection of the node 510 is illustrated. Thus, referring to FIG. 3, the filter component 428 can extract count values from the data cube 126 that are indicative of numbers of co-occurrences of terms PM2.5 and CARS, PM2.5 and FACTORIES, and PM2.5 and WIND (e.g., when PM2.5 is the primary term) in the source documents 110-114. In an example, the visualizer component 430 can highlight nodes that are representative of datasets found to be related to the dataset represented by the selected node 510 based upon the visualization instructions proffered by the user. This highlighting can be accomplished by fading non-related datasets into the background or causing nodes representative of related datasets to be visually enhanced. In this example, the CARS dataset (the dataset represented by the node 518), the FACTORIES dataset (the dataset represented by the node 526), and the WIND dataset (the dataset represented by the node 534) can be highlighted to indicate that such datasets are related to the selected PM2.5 dataset (the dataset represented by the node 510).

The visualizer component 430 additionally forms edges to further represent relationships between datasets as well as strengths of relationships between datasets (based upon the visualization instructions). For example, the visualizer component can construct a first edge 602 that connects the node 510 with the node 518, can construct a second edge 604 that connects the node 510 with the node 526, and can construct a third edge 606 that connects the node 510 with the node 534. Thus, a viewer analyzing the visualization 600 can ascertain that, based on usage of terms in identified data sources, the datasets represented by the nodes 518, 526, and 534 are each related to the dataset represented by the node 510.

Figure 7:
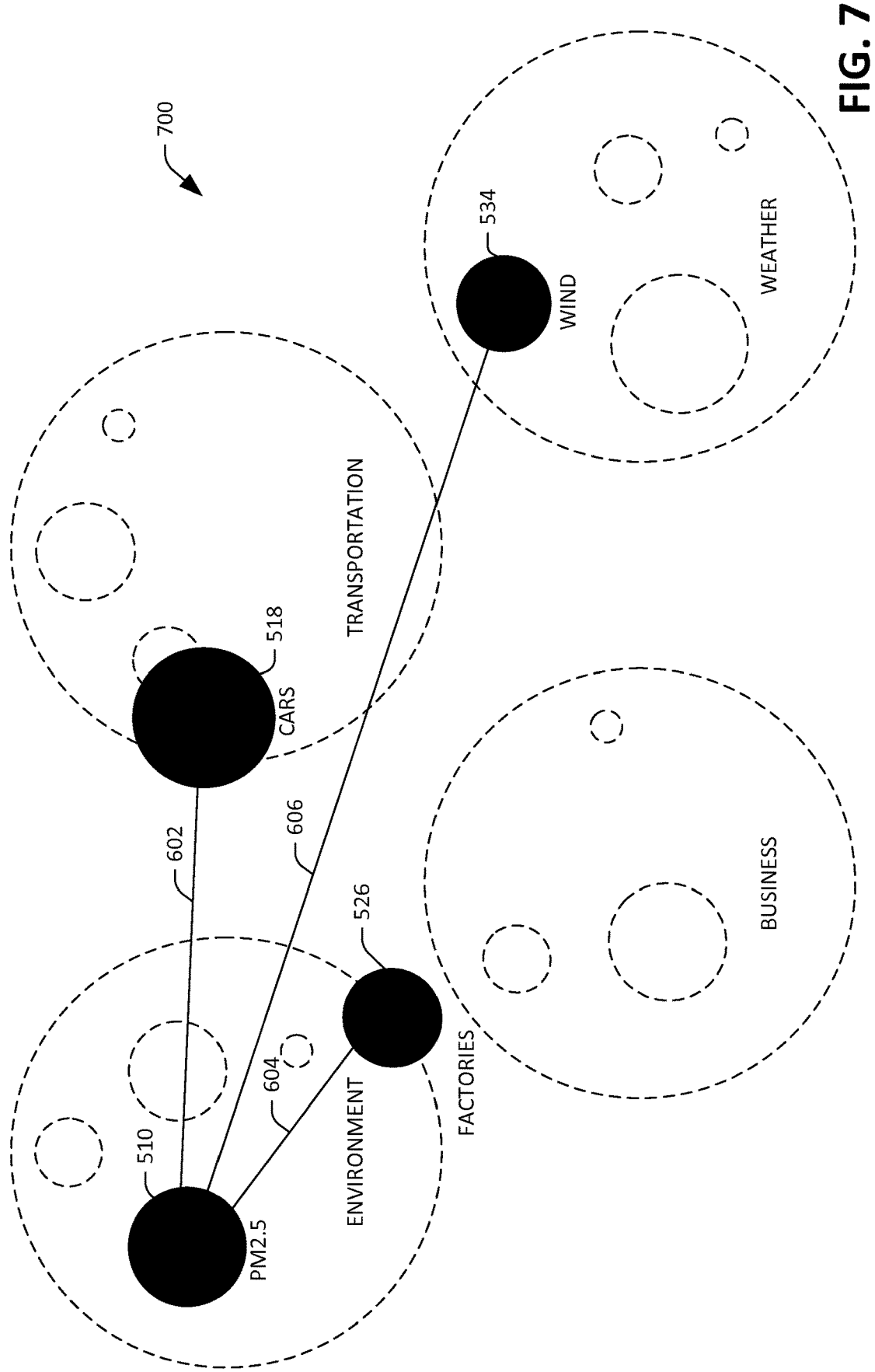
FIG. 7 illustrates an exemplary visualization that further depicts relationships between datasets.

Turning now to FIG. 7, another exemplary visualization 700 that can be constructed by the visualizer component 430 and transmitted to the client computing device 404 by the transmitter component 432 is illustrated. Here, lengths of the edges 602-606 are shown to represent strengths of relations between datasets represented by nodes in the visualization 700. Accordingly, the nodes 518, 526, and 534 can be moved in the visualization 700 (relative to the visualization 600) to visually depict strengths of relationships to a user (based on the visualization instructions set forth by the user). For example, since the length of the edge 604 is shorter than the length of the edges 602 and 606, the user can determine that the strength of the relationship between the PM2.5 dataset and the FACTORIES dataset is greater than the strengths of relationships between the PM2.5 and WIND datasets or the PM2.5 and CARS dataset. Additionally or alternatively, the line weights of the edges 602-606 can be formed to represent strengths of relationship (an amount of relation) between datasets. For example, the visualizer component 430 can construct a visualization that illustrates a smooth visual transition between the visualizations 500-700.

Figure 8:
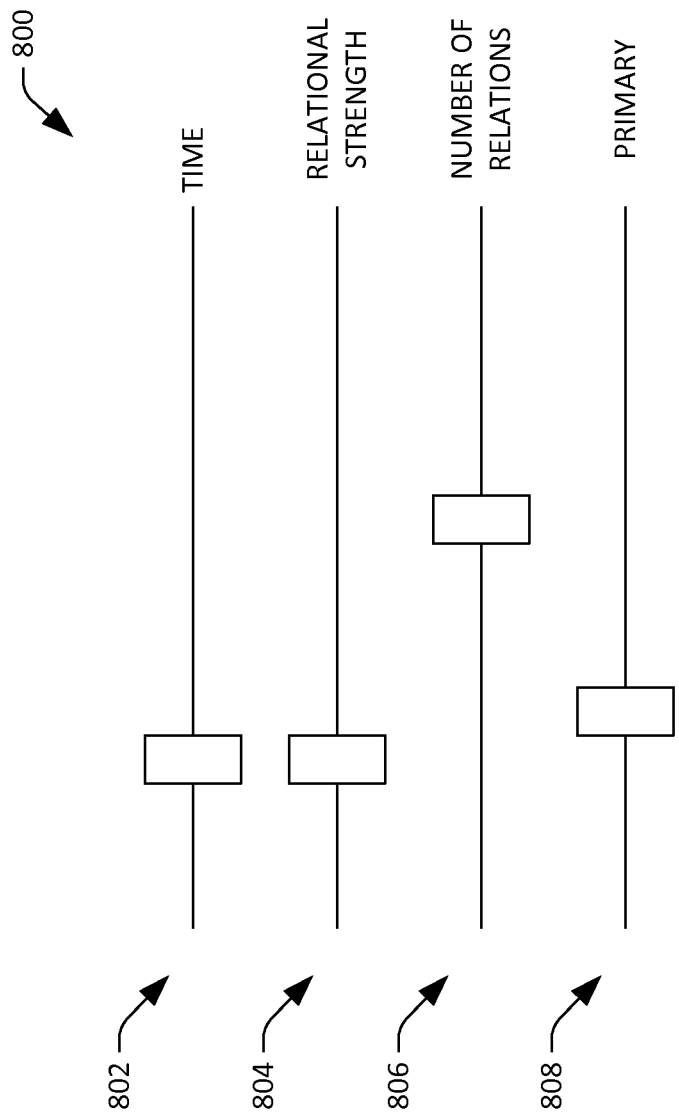
FIG. 8 illustrates exemplary graphical tools that can be used in connection with constructing a visualization that represents relationships between datasets.

Now referring to FIG. 8, a collection of user interface controls 800 that can be used by a user to set forth filter parameters for use by the filter component 428 when extracting count values from the data cube 126 is illustrated. In this example, the user interface controls 800 are depicted as being sliders, although other types of user interface controls are contemplated, such as radio buttons, dials, text boxes, pull-downs, and the like. A first slider 802 allows a user to set forth time-based filter criteria. For instance, moving the slider 802 from left to right can shorten a time window, wherein only count values extracted from source documents having timestamps in the time window will be extracted from the data cube 126 by the filter component 128.

A second slider 804 can be used to control strength of relationships illustrated in a visualization. For example, moving the slider 804 from left to right increases a threshold value, where the filter component 428 only extracts count values from the data cube 126 that are above the threshold value. Likewise, moving the slider from right to left decreases the threshold value, such that weaker relationships are visualized. A third slider 806 can be used to set a number of relations to depict in a visualization. For example, the filter component 428 can be configured to extract the top n count values from the data cube 126, and moving the third slider 806 changes the value of n. A fourth slider 808 can be used to control indices used by the filter component 428 when extracting count values. For instance, moving the fourth slider 808 to the left causes the filter component 128 to extract count values from the data cube 126 base upon primary keyword, while moving the fourth slider 808 to the right causes the filter component 128 to extract count values from the data cube 126 based upon general co-occurrence (e.g., the filter component 128 aggregates count values across indices). Accordingly, the fourth slider 808 can act as a binary switch.

Figure 9:
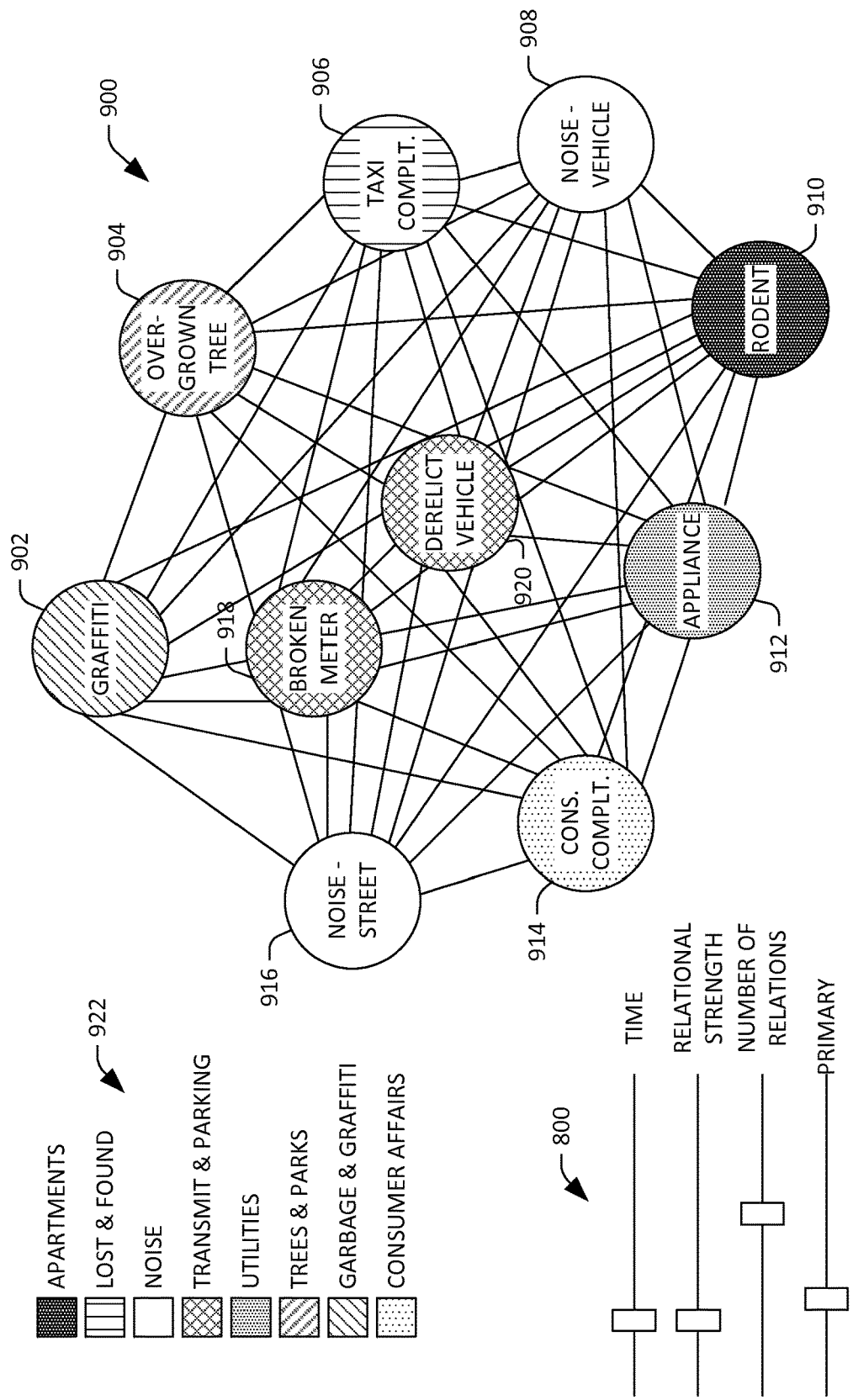
FIG. 9 illustrates an exemplary visualization that depicts relationships between datasets.

Turning now to FIG. 9, another exemplary visualization 900 that can be constructed by the visualizer component 430 and rendered by the display component 414 is illustrated. The visualization 900 includes a plurality of nodes 902-920 that are representative of a respective plurality of datasets. The nodes 902-920 are each coupled to one another by edges that represent relationships between the datasets represented by the nodes 902-920. In an example, the visualization 900 can be rendered in three dimensions and can rotate to depict relations between datasets (e.g., due to the relatively large number of datasets represented in the visualization 900). As described above, each of the edges that connect nodes can represent strength of a relationship between datasets that are represented by the nodes connected by the edge. The visualization 900 can also include a legend 922 that identifies classifications of the datasets. For instance, the node 918 and the node 920, which represent BROKEN METER and DERELICT VEHICLE datasets, can both be classified under the TRANSMIT & PARKING classification. In another example, the node 910 can represent a RODENT dataset, which is classified under the APARTMENTS classification. Accordingly, the nodes 902-920 can be assigned graphical data that is indicative of classifications of datasets represented by such nodes 902-920.

The visualization 900 also includes the user interface controls 800 that allow the user to set forth (and update) filter parameters, such that the visualization 900 can be modified "on the fly" by the user. Thus, the user can initially be provided with the visualization 900, where the visualizer component 430 constructs the visualization based upon positions of the sliders 802-808 in the user interface controls 800. The user can review the visualization 900 on the display 409, and can determine that, for instance, that she wishes the visualization 900 to depict relationships between datasets based upon recent term usage in unstructured data sources. Therefore, the user can move the slider 802 to the right, resulting in updated filter parameters being provided to the filter component 428 over the network 405. The visualizer component 430 updates the visualization based upon the received filter parameters dynamically, and the transmitter component 432 transmits the updated visualization for display on the display 409 of the client computing device 404. The visualization component 430 updates the visualization immediately responsive to receipt of the updated filter parameters—accordingly, the user can interactively explore relationships between datasets.

In another example, the user can filter the relationships depicted in the visualization 900 by selecting a node, wherein the resultant visualization is centered about the selected node. For example, the user can select the node 920 that is representative of the DERELICT VEHICLE dataset (e.g., using the pointer 542).

Figure 10:
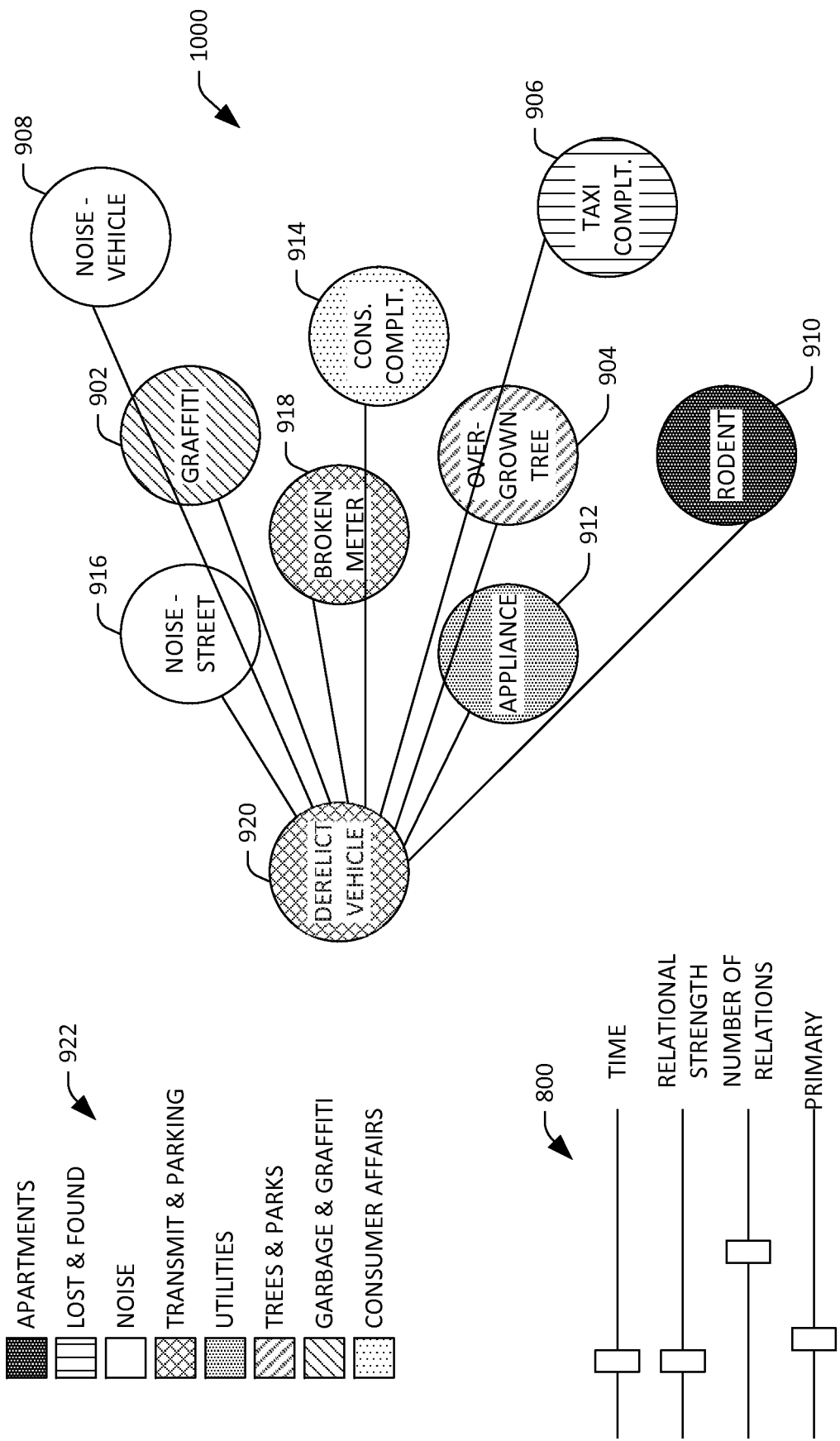
FIG. 10 illustrates another exemplary visualization that depicts relationships between datasets.

Now referring to FIG. 10, a visualization 1000 that can be constructed by the visualizer component 430 responsive to the user selecting the node 920 that is representative of the DERELICT VEHICLE dataset (and setting the sliders in the tools 800) is illustrated. Selecting the node 920 can cause the node 920 to be prominently displayed in the foreground, while edges are removed from the visualization 900 that are not connected to the node 920, thereby reducing clutter. Altering the sliders in the tools 800 can cause the visualizer component 430 to update the visualization (e.g. add nodes, remove nodes, altar lengths of edges, etc.).

FIGS. 11-14 illustrate exemplary methodologies relating to surfacing relationships between datasets in a dataset collection. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Figure 11:
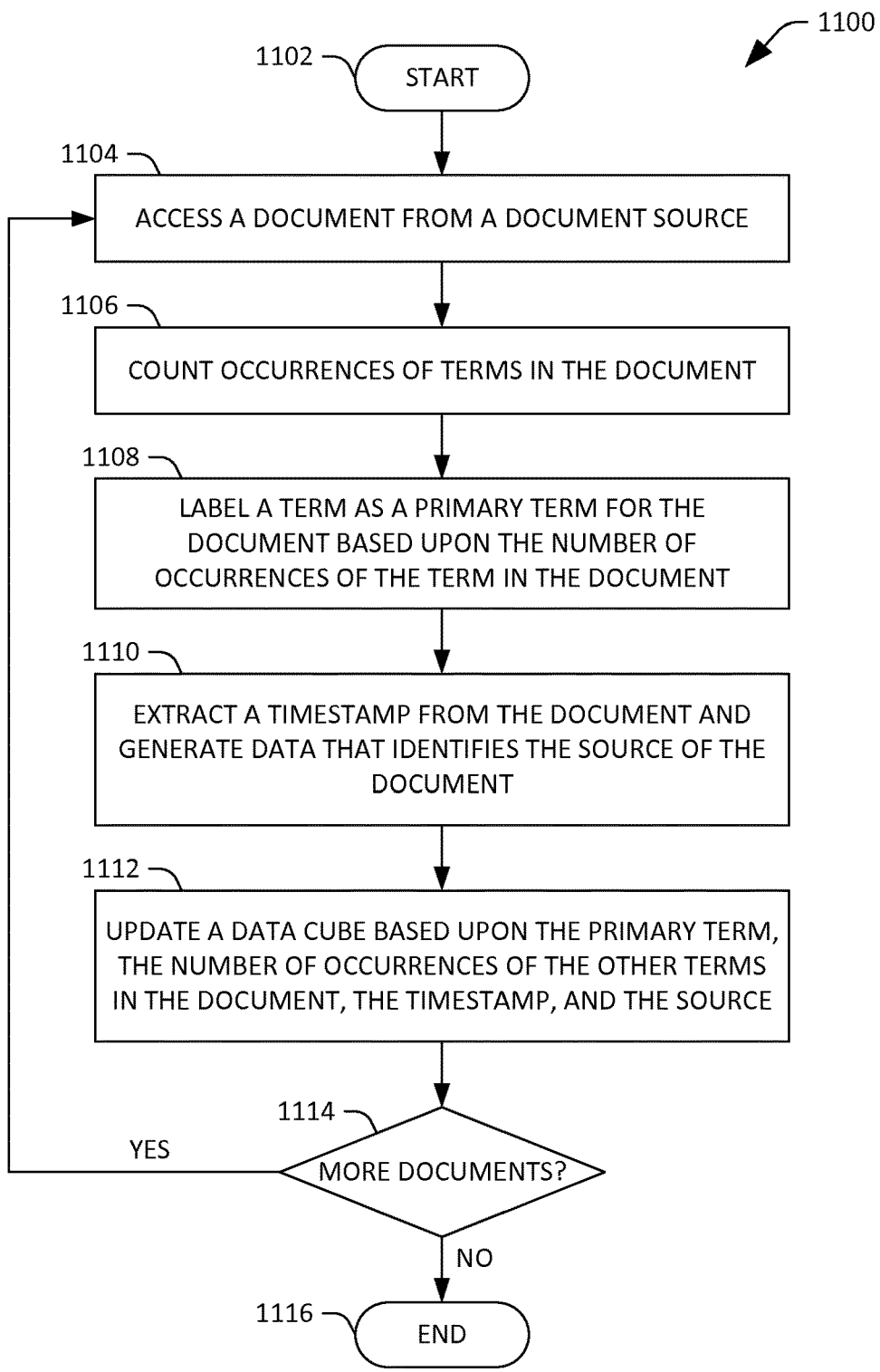
FIG. 11 is a flow diagram that illustrates an exemplary methodology for constructing a data cube, wherein the data cube is queried over to identify relationships between datasets.

With reference now to FIG. 11, an exemplary methodology 1100 that facilitates constructing the data cube 126 is illustrated. The methodology 1100 starts 1102, and at 1104, a document is accessed from a document source (e.g., one of the document sources 104-108). At 1106, occurrences of terms in the document are counted to determine numbers of occurrences of such terms. In an example, the counted terms can be limited to terms assigned to datasets. In another example, occurrences of each term (exclusive of terms in a stop list) can be counted.

At 1108, a term is labeled as a primary term for the document based upon the number of occurrences of the term in the document. For example, the primary term can be the term that occurs most often in the document.

At 1110, a timestamp is extracted from the document and data is generated that identifies the source of the document. At 1112, a data cube is updated based upon the primary term, the number of occurrences of the other terms in the document, the timestamp, and the data source. At 1114, a determination is made as to whether there are additional documents to consider. If there are additional documents to consider, the methodology 1100 returns to 1104. If there are no further documents, the methodology 1100 completes at 1116.

Figure 12:
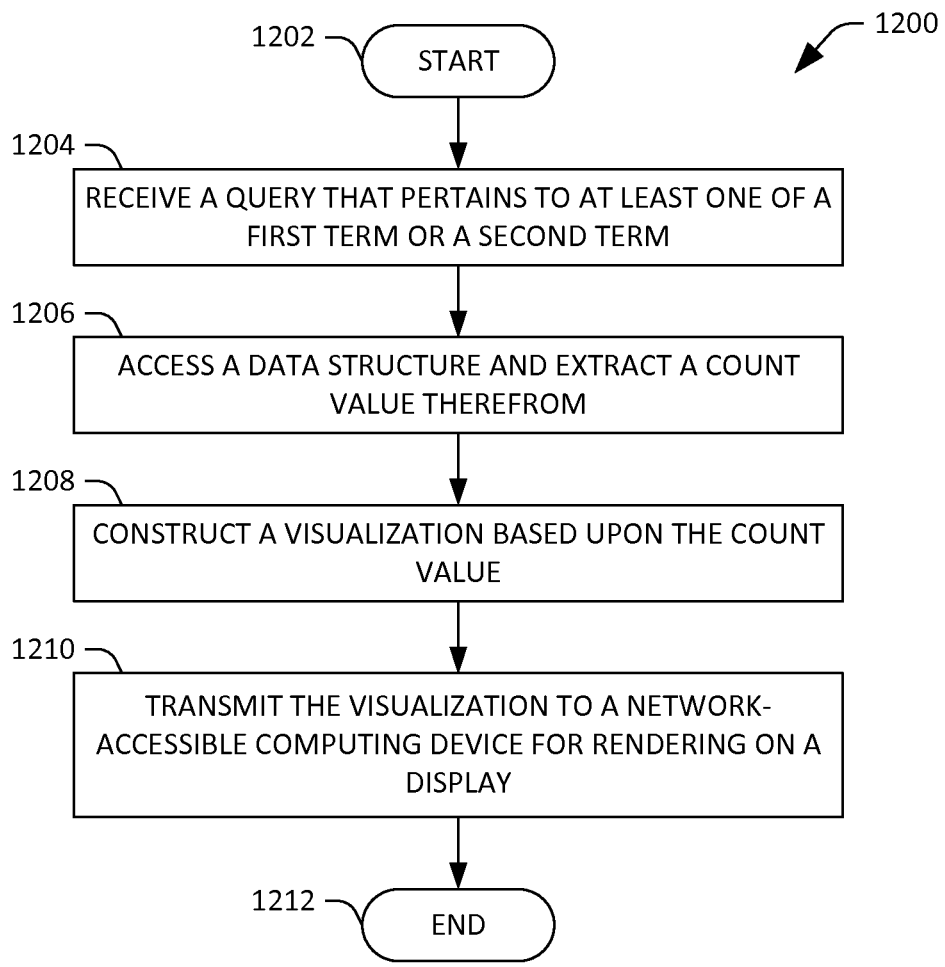
FIG. 12 is a flow diagram that illustrates an exemplary methodology for constructing a visualization that represents relationships between datasets.

Now referring to FIG. 12, an exemplary methodology 1200 that facilitates surfacing relationships between datasets is illustrated. The methodology 1200 starts at 1202, and at 1204, a query that pertains to at least one of a first term or a second term is received. For example, the first term can be designated as being descriptive of content of a first dataset, while the second term is designated as being descriptive of content of a second dataset. For example, the query can be based upon the user selecting a dataset, wherein the first term is the title of the dataset. At 1206, the data cube 126 is accessed and a count value is extracted therefrom based upon the query. The count value is indicative of an aggregate number of occurrences of the first term in a subset of documents from amongst a plurality of source documents, wherein the second term is identified in the data structure as being a primary term for each document in the subset of documents. As indicated above, the primary term for a document may be the term that occurs most often in the document. Accordingly, a term may be a primary term for numerous documents.

At 1208, a visualization is constructed based upon the count value, where the visualization indicates that the first dataset is related to the second dataset. Exemplary visualizations have been described above. At 1210, the visualization is transmitted to a network-accessible computing device for rendering on a display. The methodology 1200 completes at 1212.

Figure 13:
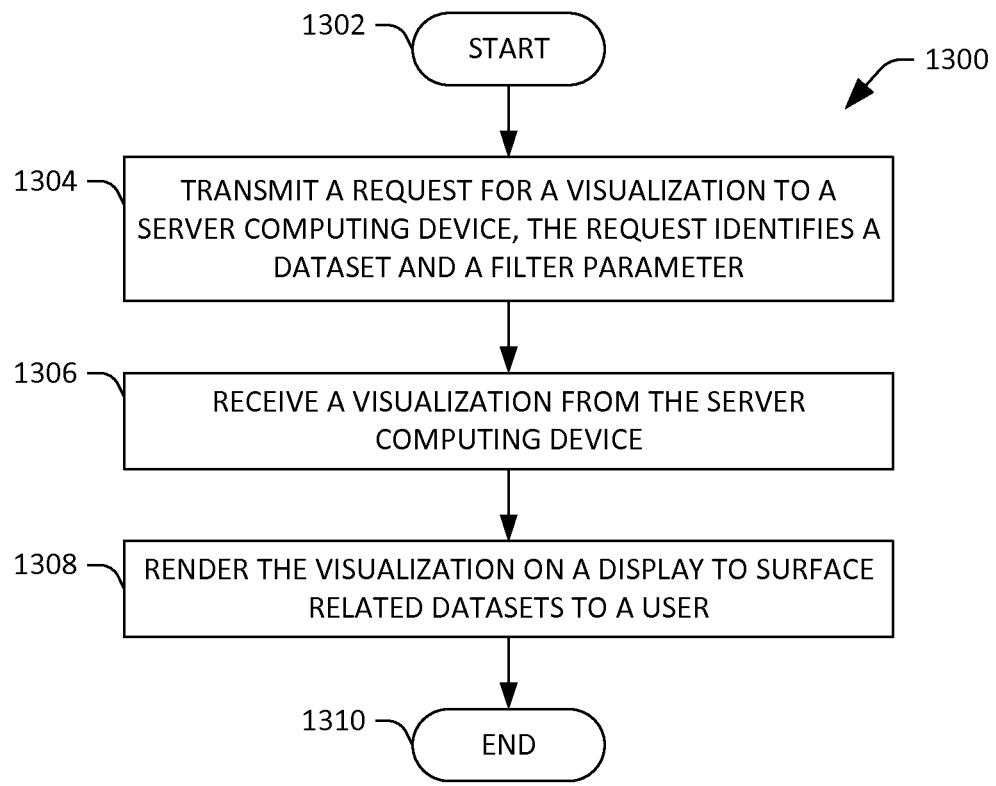
FIG. 13 is a flow diagram that illustrates an exemplary methodology for controlling a display to visually depict relationships between datasets.

Now referring to FIG. 13, an exemplary methodology 1300 for depicting relationships between datasets to a user is illustrated. The methodology 1300 starts at 1302, and at 1304, a request for a visualization is transmitted to a server computing device where the request identifies a dataset and a filter parameter. For example, the request for the visualization may be transmitted responsive to a user identifying a dataset of interest and setting forth criteria over which the data cube 126 is to be queried. At 1306, subsequent to transmitting the request for a visualization, the visualization is received from the server computing device. At 1308, the visualization is rendered on a display to identify relationships that are related to the dataset identified by the user. The methodology 1300 completes at 1310.

Figure 14:
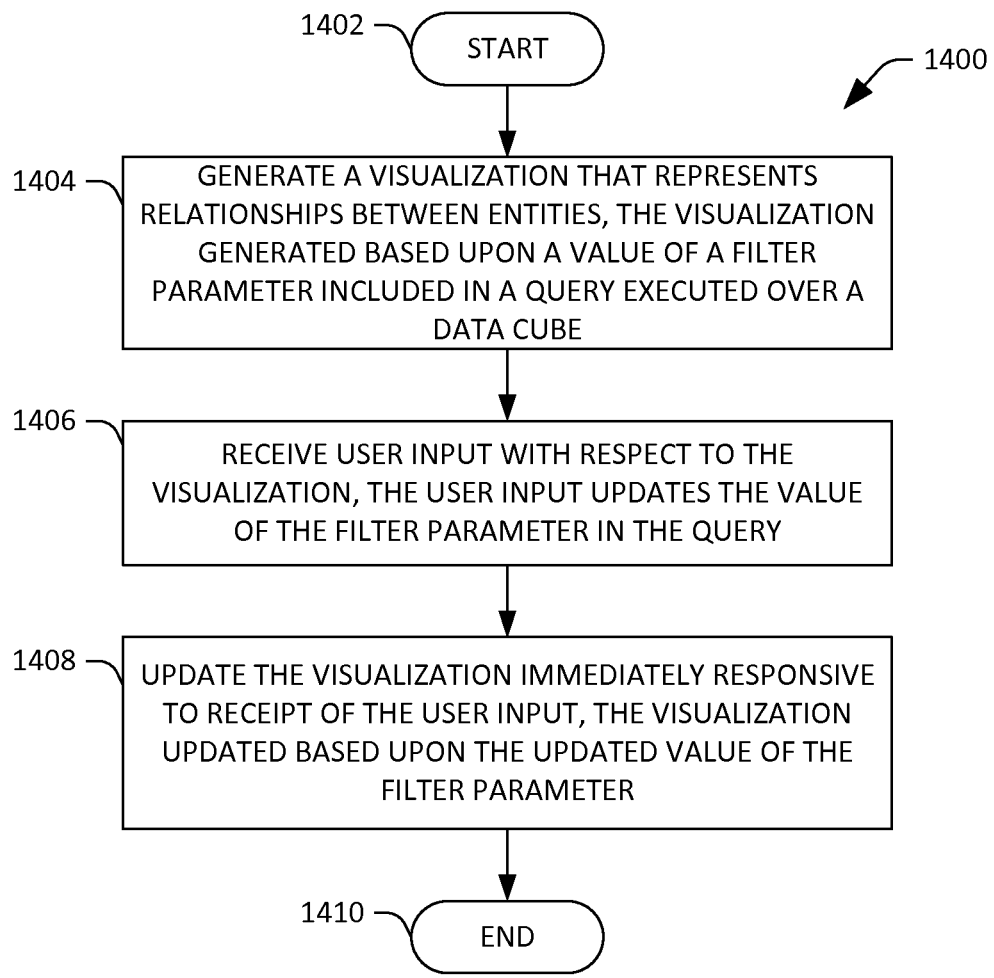
FIG. 14 is a flow diagram that illustrates an exemplary methodology for dynamically updating a visualization responsive to receipt of user input.

Now referring to FIG. 14, an exemplary methodology 1400 that facilitates updating a visualization responsive to receipt of user input is illustrated. The methodology 1400 starts at 1402, and at 1404 a visualization is generated, where the visualization represents relationships between entities. For instance, the visualization can represent relationships between datasets, as described above, although it is to be understood that the visualization can represent relationships between other types of entities. The visualization is generated based upon a query that is executed over a data cube, where the data cube comprises values that are indicative of relationships between entities. Further, the query is based upon a value of a filter parameter, wherein the data cube is filtered (e.g., sliced or diced) based upon the value of the filter parameter. The value of the filter parameter can be set by a user, may be a default value, etc. As indicated previously, the filter parameter may be time, relationship strength, or the like.

At 1406, user input is received with respect to the visualization, where the user input results in updating of the value of the filter parameter. For example, the user input can be received by way of a user interface control that is displayed on a display together with the visualization. Such user interface control can be a slider, a radio button, a pull-down, a text box, a dial, or the like.

At 1408, the visualization is updated immediately responsive to receipt of the user input. That is, the query is updated to reflect the updated value of the filter parameter, and the updated query is executed over the data cube, resulting in extraction of updated relationship data from the data cube. The visualization is then updated based upon the updated relationship data extracted from the cube, where the visualization is displayed to the user on a display. In connection with displaying the updated visualization, a smooth transition can be rendered from the previous visualization to the updated visualization. The user then has the option of further updating the filter parameter (or another filter parameter) by way of setting forth input via the user interface controls displayed together with the visualization. The methodology 1400 completes at 1410.

Numerous examples pertaining to aspects described herein are now set forth.

Example 1

A computing system that is configured to identify relationships between data sets, the computing system comprising: a processor; and computer-readable storage that comprises components that are executed by the processor, the components comprising: a filter component that receives a query that identifies at least one of a first term or a second term, the first term designated as being descriptive of content of a first dataset, the second term designated as being descriptive of content of a second dataset, the filter component further accesses a data cube and extracts a count value therefrom responsive to receipt of the query, the count value being indicative of an aggregate number of occurrences of the first term in a subset of documents from amongst a plurality of source documents, the second term is identified in the data cube as being a primary term for each document in the subset of documents; a visualizer component that forms a visualization based upon the count value extracted from the data cube by the filter component, the visualization indicates that the first dataset is related to the second dataset.

Example 2

A computing system according to Example 1, the second term being the primary keyword for a document when a number of occurrences of the second term in the document is greater than or equal to numbers of occurrences of all other terms in the document.

Example 3

A computing system according to any of Examples 1-2, the components further comprising a transmitter component that transmits the visualization to a client computing device that issued the query, the client computing device renders the visualization on a display.

Example 4

A computing system according to any of Examples 1-3, the visualization formed by the visualizer component comprises a first node, a second node, and an edge that couples the first node and the second node, the first node being representative of the first dataset, the second node being representative of the second dataset, and the edge indicating that the first dataset is related to the second dataset.

Example 5

A computing system according to Example 4, the edge of the visualization formed by the visualizer component has a length, the length indicative of the count value.

Example 6

A computing system according to Example 4, the edge of the visualization formed by the visualizer component has a thickness, the thickness indicative of the count value.

Example 7

A computing system according to any of Examples 1-6, the filter component accesses the data cube and extracts the count value based upon a value of at least one dimension of the data cube set forth in the query.

Example 8

A computing system according to Example 7, the at least one dimension being time, the value of the at least one dimension specifies a time range, each document in the subset of documents having a respective timestamp assigned thereto that indicates that the document was created in the time range set forth in the query.

Example 9

A computing system according to Example 8, the at least one dimension being source of documents, the value of the at least one dimension specifies a particular source, each document in the subset of documents labeled as having been retrieved from the particular source.

Example 10

A computing system according to any of Examples 1-9, the components further comprising: a counter component that accesses the plurality of source documents and, for each document in the plurality of source documents, computes a number of occurrences of the first term in the document and a number of occurrences of the second term in the document; and a data structure generator component that forms the data cube based upon the number of occurrences of the first term in each document and the number of occurrences of the second term in each document.

Example 11

A computing system according to Example 10, the data structure generator component determines that the second term is the primary term for each document in the subset of documents based upon a number of occurrences of the second term computed by the counter component in each document in the subset of documents.

Example 12

A computing system according to any of Examples 1-11, the query comprises a value for a filter parameter, wherein the filter component receives an update to the value for the filter parameter set forth by way of a user interface control and, responsive to receiving the update to the value of the filter parameter: updates the query to include the updated value of the filter parameter; and executes the updated query over the data cube to extract an updated count value from the data cube; and further wherein the visualizer component generates an updated visualization based upon the updated count value, the updated visualization depicts an altered relation between the first dataset and the second dataset.

Example 13

A method for visualizing relationships between data sets, the method comprising: generating a visualization that represents first relationships between entities, the visualization generated based upon a value of a filter parameter included in a query executed over a data cube, the data cube comprises count values that are indicative of relationships between the entities; receiving user input with respect to the visualization by way of a user interface control, the user input comprising an updated value of the filter parameter; and generating an updated visualization immediately responsive to receipt of the user input, the updated visualization generated based upon the updated value of the filter parameter, the updated visualization representing second relationships between the entities.

Example 14

A method according to Example 13, the entities being datasets.

Example 15

A method according to Example 14, wherein generating the visualization comprises: receiving the query, the query identifies at least one of a first term or a second term, the first term designated as being descriptive of content of a first dataset in the datasets, the second term designated as being descriptive of content of a second dataset in the datasets; extracting a count value from the data cube responsive to receipt of the query, the count value being indicative of an aggregate number of occurrences of the first term in a subset of documents from amongst a plurality of source documents, the second term is identified in the data cube as being a primary term for each document in the subset of documents; and generating the visualization based upon the count value extracted from the data cube by the filter component, the visualization indicates that the first dataset is related to the second dataset.

Example 16

A method according to Example 15, wherein generating the visualization based upon the count value comprises: forming a first node that is representative of the first dataset; forming a second node that is representative of the second dataset; and connecting the first node and the second node with an edge, the edge indicating that the first dataset is related to the second data set.

Example 17

A method according to Example 16, wherein connecting the first node and the second node with the edge comprises: computing a length of the edge based upon the count value; and connecting the first node and the second node with the edge having the length.

Example 18

A method according to any of Examples 16-17, wherein forming the first node comprises computing a size of the first node based upon a number of entries in the first dataset, and wherein forming the second node comprises computing a size of the second node based upon a number of entries in the second dataset.

Example 19

A method according to any of Examples 13-18, wherein the user interface control is one of a slider, a dial, a text box, or a radio button.

Example 20

A computer-readable storage medium comprising instructions that, when executed by a processor, cause the processor to perform acts comprising: accessing a data cube and extracting a count value therefrom responsive to receipt of a query that identifies at least one of a first dataset or a second dataset, the count value being indicative of a number of documents in a set of documents that include both a first term and a second term, the first term assigned to a first dataset, the second term assigned to a second dataset; and constructing a visualization based upon the count value, the visualization indicating that the first dataset is related to the second dataset, the visualization comprises a first node that is representative of the first dataset, a second node that is representative of the second data set, and an edge that has a length, the edge connects the first node with the second node, the length indicative of the count value extracted from the dataset.

Example 21

A computing system for visualizing relationships between data sets, the computing system comprising: means for generating a visualization that represents first relationships between entities, the visualization generated based upon a value of a filter parameter included in a query executed over a data cube, the data cube comprises count values that are indicative of relationships between the entities; means for receiving user input with respect to the visualization by way of a user interface control, the user input comprising an updated value of the filter parameter; and means for generating an updated visualization immediately responsive to receipt of the user input, the updated visualization generated based upon the updated value of the filter parameter, the updated visualization representing second relationships between the entities.

Figure 15:
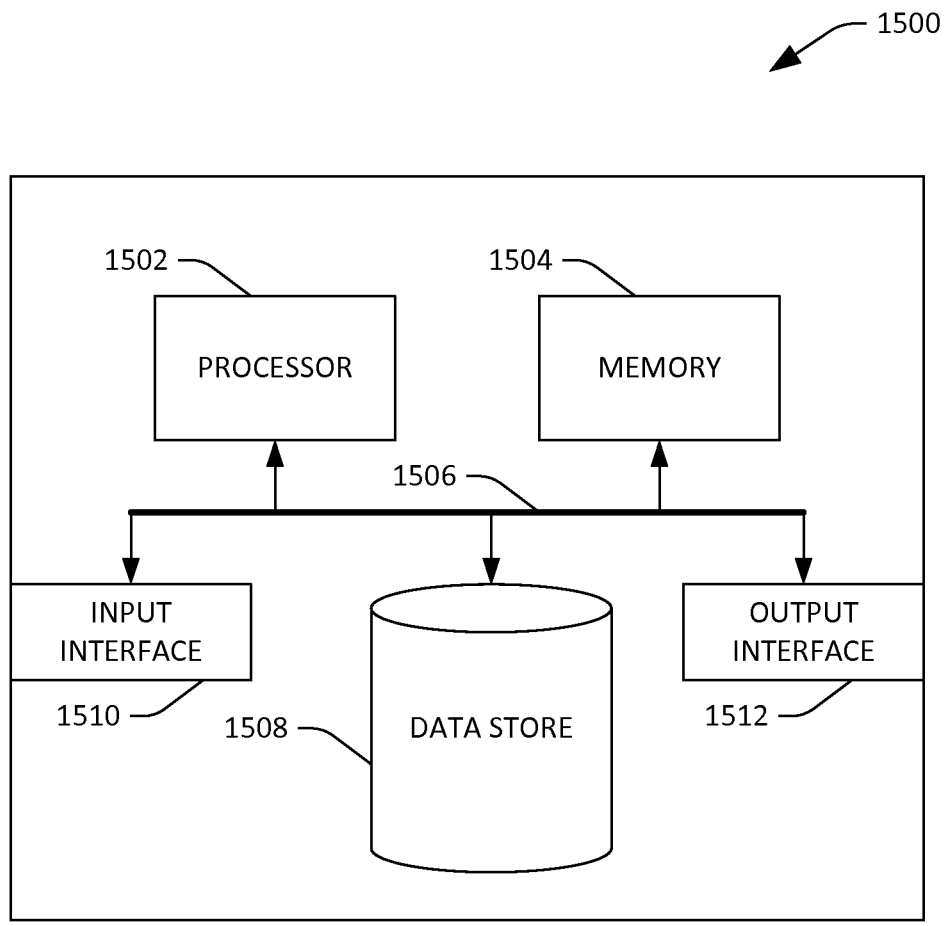
FIG. 15 illustrates an exemplary computing system.

Referring now to FIG. 15, a high-level illustration of an exemplary computing device 1500 that can be used in accordance with the systems and methodologies disclosed herein is illustrated. For instance, the computing device 1500 may be used in a system that supports constructing the data cube 126. By way of another example, the computing device 1500 can be used in a system that supports generating a visualization that depicts relationships between datasets. The computing device 1500 includes at least one processor 1502 that executes instructions that are stored in a memory 1504. The instructions may be, for instance, instructions for implementing functionality described as being carried out by one or more components discussed above or instructions for implementing one or more of the methods described above. The processor 1502 may access the memory 1504 by way of a system bus 1506. In addition to storing executable instructions, the memory 1504 may also store terms of interest, at least a portion of a data cube, etc.

The computing device 1500 additionally includes a data store 1508 that is accessible by the processor 1502 by way of the system bus 1506. The data store 1508 may include executable instructions, datasets, the data cube 126, etc. The computing device 1500 also includes an input interface 1510 that allows external devices to communicate with the computing device 1500. For instance, the input interface 1510 may be used to receive instructions from an external computer device, from a user, etc. The computing device 1500 also includes an output interface 1512 that interfaces the computing device 1500 with one or more external devices. For example, the computing device 1500 may display text, images, etc. by way of the output interface 1512.

It is contemplated that the external devices that communicate with the computing device 1500 via the input interface 1510 and the output interface 1512 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1500 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1500 may be a distributed system. Thus, for instance, several devices may be in communication by way of a network connection and may collectively perform tasks described as being performed by the computing device 1500.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computing system that is configured to identify relationships between datasets, the computing system comprising:
   a processor; and
   computer-readable storage that comprises program code executable by the processor to cause the computing system to:
   display a visualization including a plurality of nodes, each of the plurality of nodes representing a respective dataset and associated with a respective primary term of the respective dataset;
   receive a user selection of a first node of the plurality of nodes of the visualization; and
   in response to the user selection:
   determine a first primary term associated with the first node;
   identify a first dataset represented by the first node;
   determine a number of occurrences of each of a plurality of second terms in the first dataset;
   for each of the plurality of second terms, identify a respective one of the plurality of nodes for which the second term is identical to a primary term of a respective dataset of the identified node; and
   modify the displayed visualization to present edges between the first node and the identified nodes, and to highlight the first node and the identified nodes with respect to ones of the plurality of nodes other than the first node and the identified plurality of nodes, wherein an edge between the first node and one of the identified nodes represents the number of occurrences of the primary term of the one of the identified nodes in the first dataset.

2. The computing system of claim 1, a number of occurrences of a primary term of one of the plurality of nodes being greater than or equal to numbers of occurrences of all other terms in the one of the plurality of nodes.

3. The computing system of claim 1, the computing system further to transmit the modified visualization to a client computing device that issued the query.

4. The computing system of claim 1, wherein a length of the edge between the first node and one of the identified nodes represents the number of occurrences of the primary term of the one of the identified nodes in the first dataset.

5. The computing system of claim 1, wherein a thickness of the edge between the first node and one of the identified nodes represents the number of occurrences of the primary term of the one of the identified nodes in the first dataset.

6. The computing system of claim 1, the computing system further to determine the number of occurrences of each of the plurality of second terms in the first dataset based upon a value of at least one dimension of a data cube set forth in the query.

7. The computing system of claim 6, wherein the at least one dimension is time, the value of the at least one dimension specifies a time range, each document in the first dataset from which the number of occurrences was determined having a respective timestamp assigned thereto that indicates that the document was created in the time range.

8. The computing system of claim 6, wherein the at least one dimension is document source, the value of the at least one dimension specifies a particular source, each document in the first dataset from which the number of occurrences was determined labeled as having been retrieved from the particular source.

9. The computing system of claim 1, the computing system further to:
generate a data cube based upon the number of occurrences of each of the plurality of second terms in the first dataset.

10. A method for visualizing relationships between datasets, the method comprising:
displaying a visualization including a plurality of nodes, each of the plurality of nodes representing a respective dataset and associated with a respective primary term of the respective dataset;
receiving a user selection of a first node of the plurality of nodes of the visualization; and
in response to the user selection:
determine a first primary term associated with the first node;
identifying a first dataset represented by the first node;
determining a number of occurrences of each of a plurality of second terms in the first dataset;
for each of the plurality of second terms, identifying a respective one of the plurality of nodes for which the second term is identical to a primary term of a respective dataset of the identified node; and
modifying the displayed visualization to present edges between the first node and the identified nodes, and to highlight the first node and the identified nodes with respect to ones of the plurality of nodes other than the first node and the identified plurality of nodes, wherein an edge between the first node and one of the identified nodes represents the number of occurrences of the primary term of the one of the identified nodes in the first dataset.

11. The method of claim 10, wherein the first primary term is designated as being descriptive of the first dataset, and the primary term of each of the plurality of nodes is designated as being descriptive of a respective one of the plurality of nodes.

12. The method of claim 10, further comprising:
computing a length of the edge between the first node and one of the identified nodes based upon the number of occurrences of the primary term of the one of the identified nodes in the first dataset.

13. The method of claim 10, further comprising forming the first node by computing a size of the first node based upon a number of entries in the first dataset.

14. A computer-readable storage device comprising instructions that, when executed by a processor, cause the processor to perform acts comprising:
displaying a visualization including a plurality of nodes, each of the plurality of nodes representing a respective dataset and associated with a respective primary term of the respective dataset;
receiving a user selection of a first node of the plurality of nodes of the visualization; and
in response to the user selection:
determining a first primary term associated with the first node;
identifying a first dataset represented by the first node;
determining a number of occurrences of each of a plurality of second terms in the first dataset;
for each of the plurality of second terms, identifying a respective one of the plurality of nodes for which the second term is identical to a primary term of a respective dataset of the identified node; and
modifying the displayed visualization to present edges between the first node and the identified nodes, and to highlight the first node and the identified nodes with respect to ones of the plurality of nodes other than the first node and the identified plurality of nodes, wherein an edge between the first node and one of the identified nodes represents the number of occurrences of the primary term of the one of the identified nodes in the first dataset.

* * * * *